US007129615B2

(12) United States Patent
Arai et al.

(10) Patent No.: US 7,129,615 B2
(45) Date of Patent: Oct. 31, 2006

(54) METAL COATED CARBON BRUSH

(75) Inventors: Miyozi Arai, Kagawa (JP); Kazuhiro Takahashi, Kagawa (JP); Masayuki Takuma, Kagawa (JP); Takahiro Sakoda, Kagawa (JP)

(73) Assignee: Totankako Co., Ltd., Osaka (JP)

( * ) Notice: Subject to any disclaimer, the term of this patent is extended or adjusted under 35 U.S.C. 154(b) by 0 days.

(21) Appl. No.: 10/818,986

(22) Filed: Apr. 6, 2004

(65) Prior Publication Data

US 2004/0212272 A1 Oct. 28, 2004

(30) Foreign Application Priority Data

Apr. 9, 2003 (JP) ............................. 2003-105195

(51) Int. Cl.
*H02K 39/24* (2006.01)

(52) U.S. Cl. ....................... 310/251; 310/252; 310/253

(58) Field of Classification Search ............ 310/42–44, 310/248–253
See application file for complete search history.

(56) References Cited

U.S. PATENT DOCUMENTS 2,777,081 A * 1/1957 Miner, Jr. ................... 310/228
4,483,678 A * 11/1984 Nishio et al. ............ 433/201.1
4,913,706 A * 4/1990 Luoma et al. ............ 29/623.5

FOREIGN PATENT DOCUMENTS

| | | | | |
|---|---|---|---|---|
| CN | 1152809 | | * | 6/1997 |
| JP | 57-201068 | | | 6/1956 |
| JP | 63-039441 | A | | 2/1988 |
| JP | 05-182733 | A | | 7/1993 |
| JP | 06-022506 | A | | 1/1994 |
| JP | 08-242559 | A | | 9/1996 |
| JP | 08-289507 | A | | 11/1996 |
| JP | 10-070868 | A | | 3/1998 |
| JP | 10-080107 | A | | 3/1998 |
| JP | 2002-197315 | A | | 7/2000 |
| JP | 2002-056944 | A | | 2/2002 |
| JP | 2002-84715 | A | | 3/2002 |
| JP | 2002084715 | A | * | 3/2002 |
| JP | 2004099782 | A | * | 4/2004 |

OTHER PUBLICATIONS

Lee P K (books; pp. 133-140;llt Chicago, IL; 1980).*

* cited by examiner

*Primary Examiner*—Thanh Lam
(74) *Attorney, Agent, or Firm*—The Webb Law Firm

(57) ABSTRACT

Disclosed is a metal coated carbon brush having a carbonaceous substrate and a metal coating formed on a surface of the carbonaceous substrate having a mean pore radius of 0.1–2.0 μm and an accumulative pore volume of 50–600 $mm^3/g$.

4 Claims, 3 Drawing Sheets
(1 of 3 Drawing Sheet(s) Filed in Color)

METAL COATED CARBON BRUSH

BACKGROUND OF THE INVENTION

1. Field of the Invention

The present invention relates to a metal coated carbon brush for electric motor.

2. Description of the Related Art

With reference to FIG. 1, recently on electric motor 2 having a carbon brush 1 (hereinafter referred to as brush) has been getting compact and required to have a large capacity. Therefore, as the carbon brush 1, small size, lower resistance loss of electric conductivity (hereinafter referred to as resistance loss) and lower wear has been required.

Conventionally, as the carbon brush used for slip ring or low voltage electric motor, a metallic carbon brush which consists of graphite powder mixed with metal powder and sintered has often been used. However, as increasing the metal content reduces the resistance loss of carbon brush, there are some problems such as inferior lubrication, anti-arc property, and increasing wear.

Also, as an AC commutator motor, there is a problem that a commutation gets worse and the wear increases if low resistance material is used to decrease the resistance loss.

To the contrary, in the case of using high resistance material and applying greater current to a brush, the brush temperature increases due to resistant heating. Although the brush is usually produced by embedded a lead wire with copper powder or the like and compressed to join with carbon brush body. As current is applied, there is a problem that the brush temperature increases and copper powder of caulked part is oxidized and current flow gets worse and at last electric motor stops.

Also, among the AC commutator motor, the electric motor required for higher revolution such as for an electric cleaner, there is a resin bonded type carbon brush, which consists of graphite powder and resin binder and combines and cured, due to the requirement of excellent commutation at the time of high number of revolution during long life time. However, in case of resin bonded type brush, the brush temperature is increased due to the high resistance, under the high current density, and resulting in degradation of resin used as binder.

To solve these problems, a carbon brush which surface is coated with metal having a good electric conductivity to decrease the electric resistance of whole carbon brush which includes the carbon as a component is well known (For example, patent reference 1 is referred).

Japanese unexamined (Kokai) patent publication Hei 5-182733 is shown for example.

However, since it was difficult to coat the metal with same thickness on the surface of carbonaceous material, due to the variation of the thickness, in some case resulting in uneven coloring on the surface of the metal. Therefore, brush users sometimes feel uncomfortable. As the uneven coloring also causes the oxidation of the metal, it cannot maintain the good electric resistance.

Accordingly, the purpose of the present invention is to provide a metal coated carbon brush having a uniform thickness of metal coating and to prevent the uneven coloring.

SUMMARY OF THE INVENTION

With reference to FIG. 2, a metal coated carbon brush 3 to solve the above problems is a carbonaceous substrate 4 and a metal coating 5 formed on a surface of the carbonaceous substrate 4, wherein the carbonaceous substrate 4 having mean pore radius of 0.1–2.0 μm and accumulative pore volume of 50–600 $mm^3/g$. Also, the metal is selected from the group consisting of copper, silver or silver coated copper. Furthermore, the thickness of the metal coating 5 is 1–10 μm. Also the metal coating 5 is formed by electroless plating.

As the carbon brush substrate used for the present invention, ① graphite powders are kneaded with a binder such as thermosetting resin and cured (resin bonded type carbon brush), ② graphite powders are kneaded with a binder such as thermosetting resin or pitch and baked and the binder component is carbonized (CG type), ③ graphite powders are kneaded with a binder such as thermosetting resin or pitch and baked and further graphitization by heat-treatment and at least one of the carbon components is graphitizated (EG type), are shown for examples. In the present invention, as the resin bonded type is mainly used for the substrate. In the substrate for the resin bonded type, since the resin used for the binder is not carbonized or graphitizated (only cured), electric insulation is relatively higher. Accordingly, there is an advantage that electric resistance is high and commutation is excellent. To the contrary, since the electric resistance is high, the electric resistance loss is high. As a result, there is a disadvantage that the heat loss is high, by using of the long time at a high temperature, as a result, the degradation of the resin arises and the property of the carbon brush varies.

The opposite demand like this is accomplished by coating the surrounding of the surface on the brush substrate with the metal which is selected from the group consisting of copper, silver and silver coated copper. As a result, by the action of the coated metal surrounding on the surface of the brush substrate, it is possible to reduce apparent electric resistance and to suppress the temperature increase, and to prevent the usage of the brush from a property change in spite of high electric resistance of the brush substrate. Accordingly, it is possible to compensate a disadvantage of the resin bonded type substrate. Therefore, it is possible to produce a high performance brush with the merit of the resin bonded type substrate.

The carbon brush substrate to coat the metal is prepared having mean pore radius of 0.1–2.0 μm, particularly 0.5–1.5 μm is more preferable, and accumulative pore volume of 50–600 $mm^3/g$, 100–500 $mm^3/g$ is more preferable. Further, the thickness of metal coating on the brush substrate is controlled 1–10 μm, particularly 2–5 μm is more preferable. By means of this, uneven coloring is suppressed.

As a method for metal coating on the surface of the brush substrate, electroless plating is preferable. As the method for elecroless plating, well-known method described in the references is widely adopted. Electroless plating is explained by "Electroless plating" [Maki-Shoten Publishing and Tokuzo Kambe (1986)] in detail, for example, and forms the strong metal coating on the surface of the brush substrate regarding the present invention. As shown in this reference, the principle of copper electroless plating is shown below. As a complexing agent, tartaric acid alkali salt or EDTA (ethylenediaminetetraacetic acid) is added to copper salt solution and to be complexing and stabilized in a weak alkali. After that, as a reducing agent, formaldehyde or hydrazine salt is added and copper coating forms on the surface of the substrate. Before performing the electroless plating, stannous chloride ($SnCl_2$) as a sensitizer and palladium chloride ($PdCl_2$) as an activator are added in the pretreatment solution. Then, the thickness of 1–10 μm of the metal coating is formed on the surface of the substrate by performing the electroless plating at room temperature within 30 minutes, and within 15 minutes is more preferable. In this case, although some of general electroless plating solution have an electrolysis temperature of 80±5° C. (most preferable), to delay the reaction speed and to make the metal structure fine, electrolysis temperature is controlled at room temperature.

BRIEF DESCRIPTION OF THE DRAWINGS

The patent or application file contains at least one drawing executed in color. Copies of this patent with a color drawing will be provided by the United States Patent and Trademark Office upon request and payment of the necessary fees.

DETAILED DESCRIPTION OF THE PREFERRED EMBODIMENTS

Figure 1:
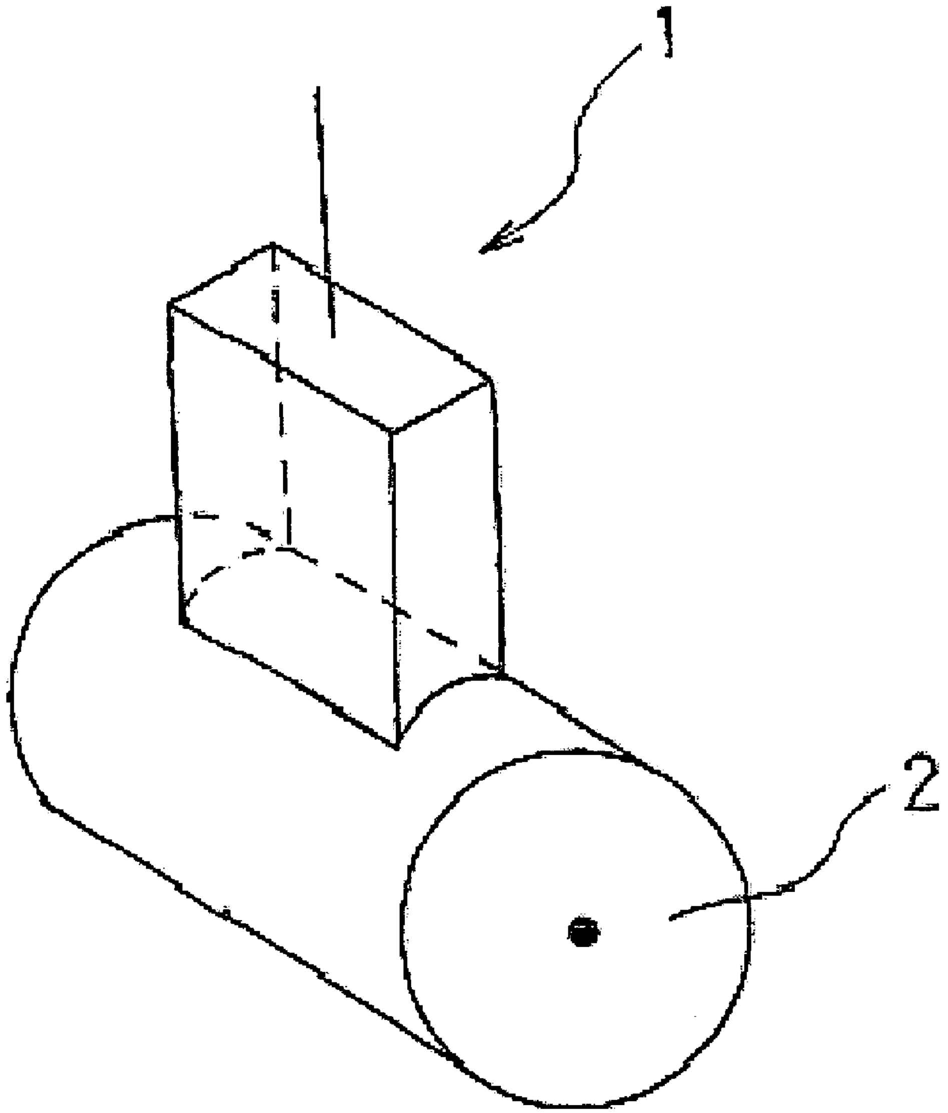
Fig. 1 (Prior Art)
FIG. 1 illustrates a prior art carbon brush interacting with an electric motor.
Figure 2:
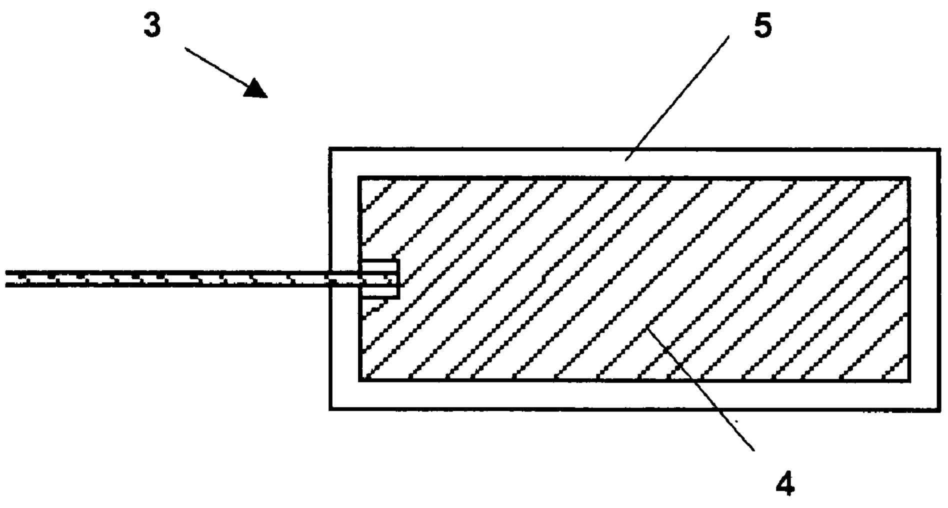
FIG. 2 is a cross-sectional view of a metal coated carbon brush in accordance with the present invention.
Figure 3:
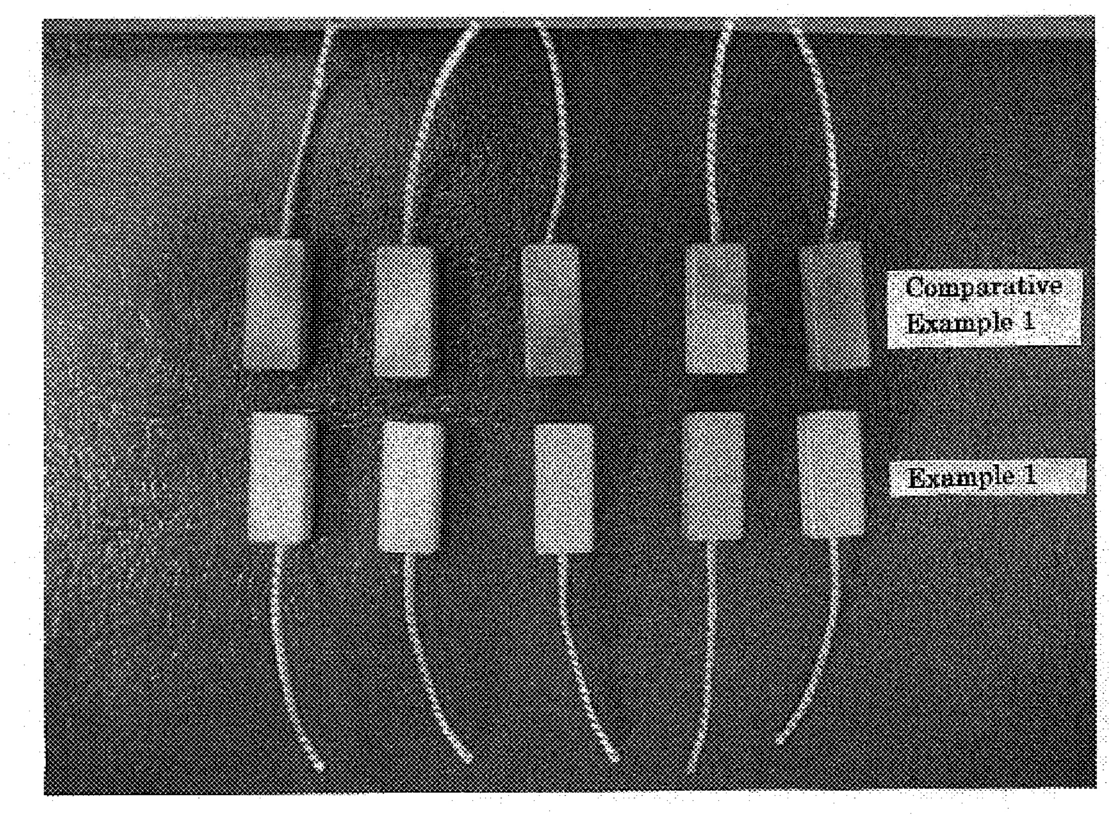
FIG. 3 is a photograph of the appearance of the carbon brush to compare example 1 with comparative example 1.

Hereinafter, metal coated carbon brush in accordance with the present invention is more concretely explained. However, the present invention is not limited to these examples.

EXAMPLE 1

Graphite particles having mean particle size of 50 μm in 75 mass % and epoxy resin as a binder in 25 mass % were mixed and kneaded. This kneaded material was pulverized to have predetermined size, and formed to have predetermined shape at a pressure of 15 MPa, after that the binder was heated at 180° C. and cured, and the brush substrate having mean pore radius of 1.1 μm and accumulative pore volume of 339 $mm^3/g$ was prepared. Next, after washing with water, this substrate was being immersed into the pretreatment solution which was consisted of water and alcohol, and 1.0 mass % of $SnCl_2$ as sensitizer was added. Further, after washing with water again, the substrate was immersed into the pretreatment solution which was consisted of water, and was added $PdCl_2$ as an activator. The substrate was immersed into each pretreatment solution for 3 minutes and reacted, and then washed with water. After that, the substrate was immersed into the copper sulfide solution which was being controlled the range of 20–25° C., and then, sodium hydroxide was added into this solution. Finally, the substrate was uniformly coated with copper having thickness of 2 μm. Namely, the mean pore radius and accumulative pore volume of the substrate were measured by mercury porosimetry (made of FISON Co., LTD.) and were calculated by following formula.

$$2\pi r\delta\cos\theta=\pi r^2\cdot P$$

$$r=\frac{-2\delta\cos\theta}{P}$$

In this case, r is pore radius, δ is surface tension (ordinary $4.8\times10^{-2}$N is adopted), P is applied pressure, θ is contact degree (141.3° is adopted). Also, measured range was 75 μm–0.0068 μm of pore radius ($9.8\times10^2$ Pa–$10.8\times10^7$ Pa), and mean pore radius is shown as ½ of the radius of 0.01 μm of accumulative pore volume. In addition, mean pore radius and accumulative pore volume of these brush substrates were not changed by electroless plating.

EXAMPLE 2

Graphite particles having mean particle size of 50 μm in 75 mass % and epoxy resin as a binder in 25 mass % were mixed and kneaded. This kneaded material was pulverized to have predetermined size, and formed to have predetermined shape at a pressure of 20 MPa, after that the binder is heated at 180° C. and cured, and the brush substrate having mean pore radius of 2 μm and accumulative pore volume of 56 $mm^3/g$ was prepared. Hereinafter, the copper was coated on the surface of the substrate as same as example 1.

EXAMPLE 3

Graphite particles having mean particle size of 50 μm in 75 mass % and epoxy resin as a binder in 25 mass % were mixed and kneaded. This kneaded material was pulverized to have predetermined size, and formed to have predetermined shape at a pressure of 10 MPa, after that the binder was heated at 180° C. and cured, and the brush substrate having mean pore radius of 1.9 μm and accumulative pore volume of 571 $mm^3/g$ was prepared. Hereinafter, the copper was coated on the surface of the substrate as same as example 1.

COMPARATIVE EXAMPLE 1

With the excepting of not adding $SnCl_2$ as the sensitizer and $PdCl_2$ as the activator into the pretreatment solution, the metal coated carbon brush having copper coated on the surface of the brush substrate was produced in accordance with example 1.

COMPARATIVE EXAMPLE 2

Graphite particles having mean particle size of 50 μm in 75 mass % and epoxy resin as a binder in 25 mass % were mixed and kneaded. This kneaded material was pulverized to have predetermined size, and formed to have predetermined shape at a pressure of 23 MPa, after that the binder was heated at 180° C. and cured, and the brush substrate having mean pore radius of 0.08 μm and accumulative pore volume of 44 $mm^3/g$ was prepared. Hereinafter, the copper is coated on the surface of the substrate as same as example 1.

COMPARATIVE EXAMPLE 3

Graphite particles having mean particle size of 50 μm in 75 mass % and epoxy resin as a binder 25 in mass % were mixed and kneaded.

This kneaded material was pulverized to have predetermined size, and formed to have predetermined shape at a pressure of 9 MPa, after that the binder was heated at 180° C. and cured, and the brush substrate having mean pore radius of 2.2 μm and accumulative pore volume of 658 $mm^3/g$ was prepared. Hereinafter, the copper is coated on the surface of the substrate as same as example 1.

The metal coated carbon brush produced by comparative example 1 was observed the uneven coloring on the surface of the metal. Also, the metal coated carbon brushes produced by comparative examples 2 and 3, coatings of electroless plating were exfoliated, and uneven coloring on the surface of the metal were observed. As mentioned above, by immersing the carbon substrate having 0.1–2.0 μm of mean pore radius and 50–600 $mm^3$/g of accumulative pore volume as the carbon brush substrate into the pretreatment solution which is added $SnCl_2$ as the sensitizer and $PdCl_2$ as an activator, before performing the electroless plating, it is possible to coat the metal on the carbon brush substrate without having uneven coloring and forms strong coating. As a result, it is possible to prevent the metal coated brush from oxidation. Further, customers aesthetic sense is satisfied.

What is claimed is:

1. A metal coated carbon brush comprising: a carbonaceous substrate and a metal coating formed on a surface of the carbonaceous substrate, wherein the carbonaceous substrate has a mean pore radius of 0.1–2.0 μm and an accumulative pore volume of 50–600 $mm^3$/g.

2. The metal coated carbon brush in accordance with claim 1, wherein the metal is selected from the group consisting of copper, silver or silver coated copper.

3. The metal coated carbon brush in accordance with claim 1, wherein the thickness of metal coating is 1–10 μm.

4. The metal coated carbon brush in accordance with claim 1, wherein the metal coating is formed by electroless plating.

* * * * *